United States Patent [19]
Ims

[11] 3,836,022
[45] Sept. 17, 1974

[54] MECHANIZED TREAD BOOKING APPARATUS

[75] Inventor: Horst O. H. Ims, Waterloo, Ontario, Canada

[73] Assignee: Uniroyal, Ltd., Montreal, Quebec, Canada

[22] Filed: Oct. 20, 1972

[21] Appl. No.: 299,493

[30] Foreign Application Priority Data
Aug. 29, 1972 Canada .............................. 150441

[52] U.S. Cl.................. 214/41, 198/105, 198/128, 198/178, 214/1 Q, 214/16.4 R
[51] Int. Cl............................................ B65g 67/04
[58] Field of Search................ 214/16.4 R, 41, 1 Q; 198/25, 127, 105, 128, 178

[56] References Cited
UNITED STATES PATENTS
2,024,513  12/1935  Diescher........................ 198/105 X Primary Examiner—Robert G. Sheridan
Attorney, Agent, or Firm—Jack Posin, Esq.

[57] ABSTRACT

A method and apparatus for mechanically booking tire treads. Tire treads sequentially advancing along a first conveyor are fed to a rotating pick-up drum, where they are lifted onto a second conveyor. The second conveyor has rotary arms disposed thereon that project the tread through space onto the leaves of a tread truck. The tread truck includes an indexing unit that individually indexes each of the separate tread truck leaves into a horizontal position to receive a tread thereon. Means is provided to progressively vary the trajectories of the projected treads in order to insure that the treads will be deposited on the proper truck leaves in undistorted condition.

11 Claims, 7 Drawing Figures

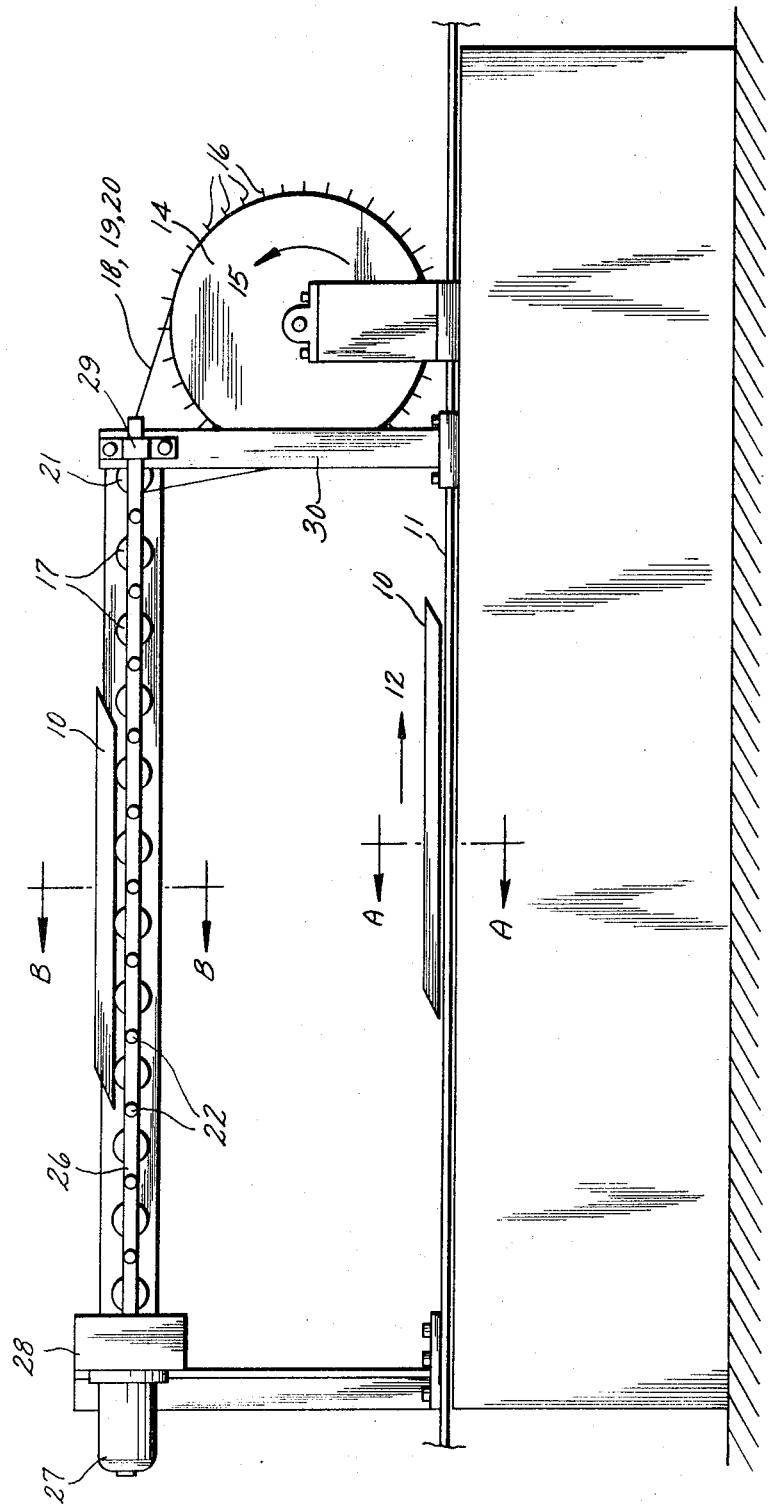
FIG. 2.
FIG. A-A.
FIG. B-B.

MECHANIZED TREAD BOOKING APPARATUS

This invention pertains to a mechanized tread booking apparatus and method.

BACKGROUND OF THE INVENTION

Heretofore, tire tread booking was a manual operation. The treads were taken from a conveyor and hand placed upon a tread truck. The tread truck consists of a stack of trays or leaves that support the treads until such time as they are incorporated into a tire and cured.

Because the treads arrive upon the conveyor every two to three seconds, very little time is afforded to the operator for placing the treads upon the truck. As a result of this, the treads are frequently incorrectly placed upon the leaves of the truck, causing physical distortion of the tire treads. This is undesirable since a tire containing a misshapen tread is of inferior quality.

SUMMARY OF THE INVENTION

The present invention was conceived as a means of eliminating the physical distortion of tire treads due to improper placement upon the truck. Tire treads in accordance with the invention will be correctly placed upon the leaves of the tread truck by mechanical means.

In accordance with one embodiment of this invention, each tread is fed by a conveyor to a rotating pickup drum. The drum contains a plurality of pins protruding from its cylindrical face. As the tread is forced under the drum, the pins are forced into the tread and cause the tread to be lifted by the rotating drum onto a second conveyor having longitudinally spaced rollers. The treads are then sequentially aerially projected from the second conveyor onto the various leaves of a tread truck. This is accomplished by means of a flipper mechanism composed of a plurality of rotary arms which move upwardly between the various conveyor rollers, lift the treads off the conveyor and project the treads aerially to the leaves of the tread truck. Suitable means are provided to index the various leaves of the tread truck into tread receiving positions and to vary the trajectories of the treads so that they will land on the proper truck leaves in undistorted condition.

OBJECTS OF THE INVENTION

It is an object of the present invention to provide a method and apparatus for mechanically booking tire treads.

It is another object of this invention to provide a conveyor-type system for mechanically booking tire treads.

It is yet another object of this invention to provide a conveyor system for booking tire treads featuring a novel tread flipping mechanism.

These and other objects of this invention will be better understood and become more apparent with reference to the following detailed description and accompanying drawings, in which:

FIG. 2 is a frontal view of the conveyor and flipping mechanism of FIG. 1;

Figure 1:
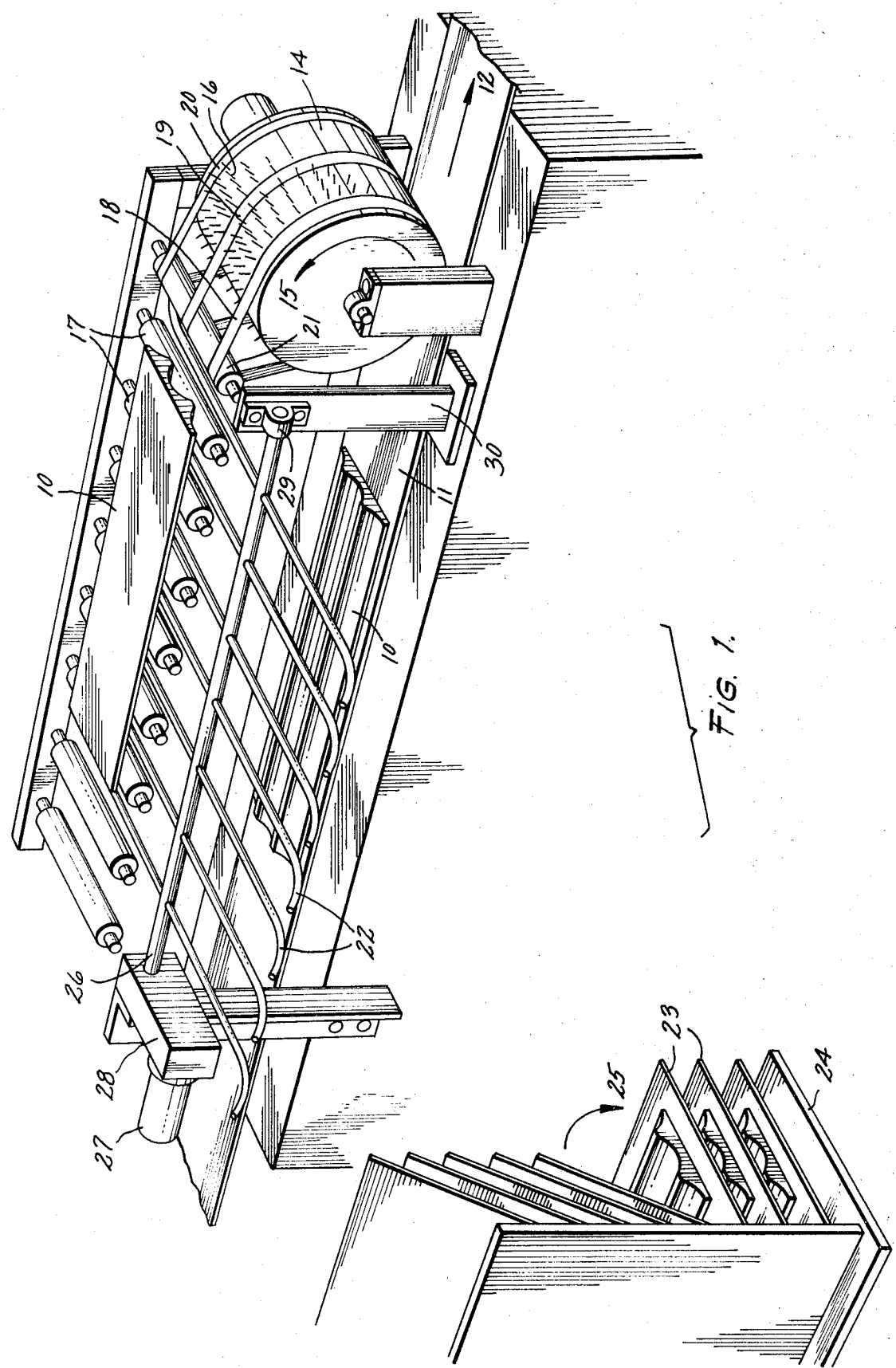
FIG. 1 is an isometric view of the apparatus of this invention.
Figure 3:
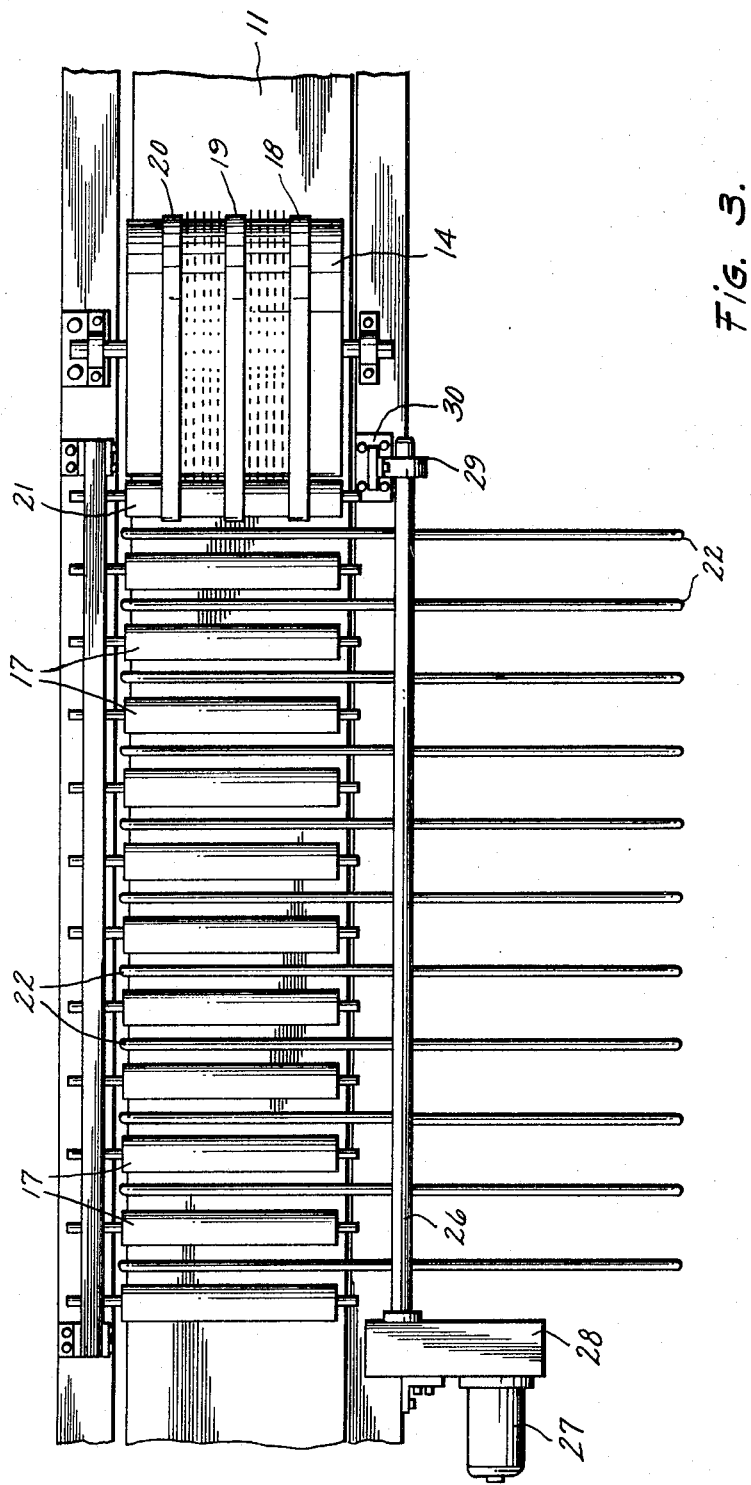
Figure 4:
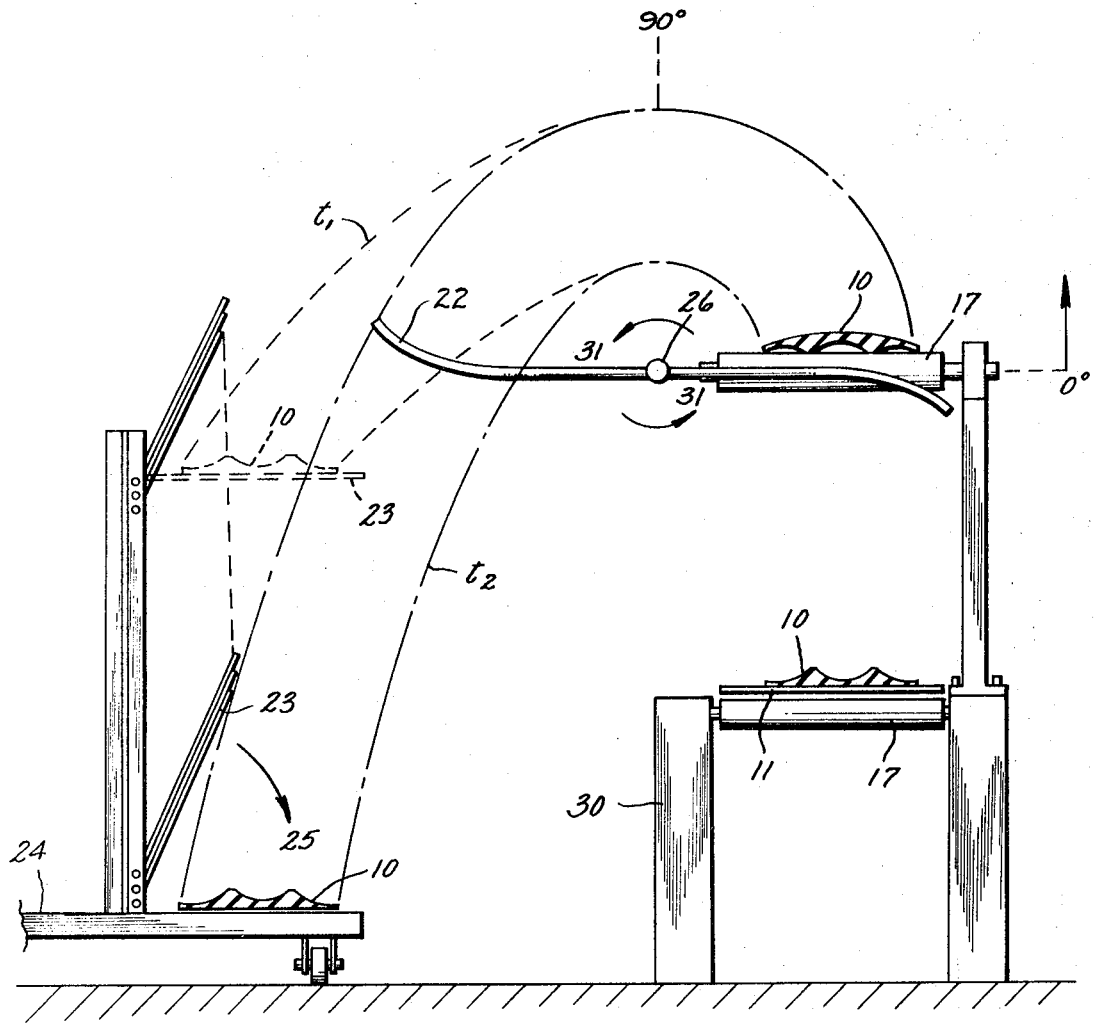

FIGS. A—A, and B—B, respectively show the cross-section of the tread disposed upon the conveyor of FIG. 2;

FIG. 3 is a top view of the conveyor and flipping mechanism of FIG. 1;

FIG. 4 is a side view of the conveyor and flipping apparatus of FIG. 1; and

Figure 5:
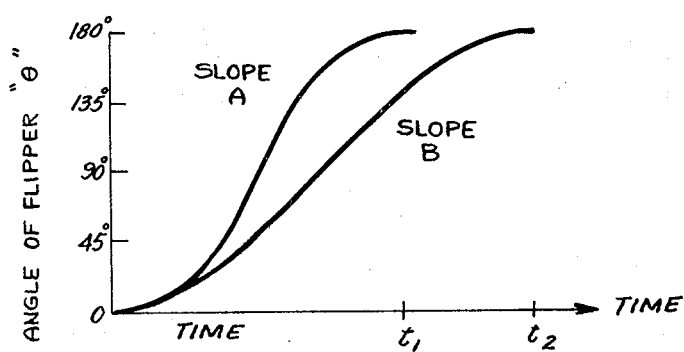

FIG. 5 is a graph showing the relative rotational speed of the flipper mechanism as it rotates through one complete cycle of 180°.

Referring to FIGS. 1 and 2, a typical tire tread 10 is shown proceeding along a first conveyor 11 moving in the direction of arrow 12. At the right-hand side of the conveyor system is a rotating drum 14 that is driven synchronously with the conveyor 11 and turns in the direction shown by arrow 15. The drum 14 has pins 16 which protrude from the drum and extend about its entire circumferential surface. The drum 14 is rotated synchronously with the conveyor 11 so that the linear velocity of the tips of the pins 16 is in proper relationship with the conveyor speed. As the tread 10 passes under the drum 14, the pins 16 pierce the tread causing the tread to become impaled upon the drum. The pins are of suitable size and shape to impale the tread without puncturing any cushion gum on the undersurface of the tread.

The tread is lifted from the first conveyor 11 by the drum 14 and is then deposited upside down upon a set of rollers 17. The tread is stripped away from the drum 14 by belts 18, 19 and 20, which serve as a stripping means and a means to convey the treads from drum 16 to rollers 17. The belts 18–20 move in concert with the drum 16, having one flight end thereof wrapped about drum 16 and the other flight end thereof wrapped about roller 21.

Suitable means (not shown) may be provided to selectively raise drum 14 sufficiently above conveyor 11 to allow treads 10 to pass under the drum without contacting pins 16 in the event that it is desired that one or more treads should bypass the tread booking apparatus.

Assuming normal cycling of a tread through the apparatus, the tread moves onto a conveyor formed by rollers 17. The rollers 17 constitute one part of the flipping mechanism. Rollers 17 are driven by suitable drive means (not shown) to smoothly receive treads from drum 14 and belts 18–20, the drive means stopping the rollers 17 when a tread is at a central position therein, such as the position of the upper tread 10 shown in FIG. 2. A set of parallel, rotatable flipper arms 22, which arms are able to pass between roller 17 (FIGS. 1 and 3) and cause the tread to be aerially projected from the rollers (FIG. 4), constitutes a second part of the flipping mechanism. In projecting the tread, the arms 22 flip the tread over to a right-side up position, while simultaneously depositing the tread upon a leaf 23 of a booking truck 24. The booking truck 24 has several leaves 23 therein movable between upper and lower positions. After each successive tread is flipped, a new leaf 23 moves from its upper to its lower, or horizontal, position (FIGS. 1 and 4), as shown by arrow 25, in order to catch a subsequent projected tread.

The flipper arms 22 rotate in unison, since they are commonly attached to a rotating rod 26. Rod 26 is driven at one end by a variable speed motor 27 through a suitable intermittent motion mechanism, such as a Geneva Drive mechanism, shown generally at 28. The rod 26 is journalled at its other end in bearing 29 which is mounted to the frame 30. The rod 26 and flipper arms 22 rotate in the direction of arrows 31 (FIG. 4), and are turned through 180° for each tread flipping cycle.

The tread truck 24 may be indexed in any one of several ways, so that the proper leaf 23 will fall in conjunction with the movement of the flipper mechanism. One way to sequence the leaves would be to augment the gravity feed of the leaves by spring loading them downwardly and limiting the downward movement of the leaves by means of electrically-controlled pins. The pins may be retracted in sequence with the workings of the flipping mechanism, i.e., every time the flipping mechanism is operated a leaf is dropped. The pins controlling the leaves can be pulled by means of individual solenoids attached to each pin. The solenoids can be sequenced by a standard rotating relay (stepping switch) which is electrically operative to close a switch to a successive solenoid each time the flipping mechanism cycles. Of course, the leaves may also be manually dropped if so desired.

Referring to FIGS. 4 and 5, the trajectory of the tread is progressively changed to land the tread on the proper tread booking leaf 23. This is accomplished by changing the setting of the speed adjustment control of the motor driving the flipper arms 22. In other words, the time required to complete a 180° flipper cycle is a function of the speed of the motor driving the flipper arms. The time $t_2$ is needed for a trajectory that will place the tread on the bottom leaf of the truck. A time $t_1$ is needed to place a tread on the top leaf of the truck. The time of rotating the flipper is progressively changed between the limiting times $t_1$ and $t_2$ by adjusting the speed control of the driving motor of the flipper for every flipping cycle. The speed setting range from $t_2$ to $t_1$ is covered in as many equal increments as there are booking leaves 23 from bottom to top of the tread truck. This action can be accomplished mechanically, electrically or electromechanically.

As an example, a rotary solenoid may be employed which energizes at the end of each flipping cycle, thus advancing the speed control of the flipper drive motor by one incremental step. After the last tread is deposited on the top leaf of the tread truck, the corresponding step of the rotary solenoid then becomes the reset step for the speed control and the whole booking cycle is repeated with another tread truck. An alternate solution would be the use of a stepping relay which advances one step with each flipping cycle, the relay being energized by the same electrical function which ends each flipping cycle. The contacts of this stepping relay will then select the proper electrical resistance of the speed control, for each successive step, so that the correct flipper speed is maintained for each flipper cycle. This stepper relay will reset to step No. 1, corresponding to $t_2$, when it receives the step command signal after the last tread, corresponding to $t_1$, has been booked. In the meantime the fully loaded tread truck will be pulled out of the booking station and an empty one properly placed for booking.

The graph in FIG. 5 shows the relative rotational speed of the flipper arm assembly as it rotates through one complete cycle of 180°. This graph shows that at the beginning of the cycle, the flipper arm assembly accelerates very gradually, reaching maximum angular velocity (as represented by the slope of the curve, i.e., $d\theta/dt$, where $\theta$ is the angle through which the flipper arm assembly has rotated from the starting position) as it turns through the 90° position. At this point the tread will separate from the flipper arms, and the flipper arm assembly then decelerates gradually and comes to a stop at the end of the cycle at 180°. Slope B corresponds to a flipper cycle that will place a tread on the bottom leaf of the tread truck and slope A corresponds to a flipper cycle that will place a tread on the top leaf of the tread truck.

The electrical control of this booking apparatus may use conventional sensors to detect the presence or absence of treads at various points. Such sensors may cause the rollers 17 to stop when a tread is sensed to be in position for flipping. Also, should there be a tread in position to be flipped when the flipper has not yet completed its previous cycle, and at the same time another tread is sensed to arrive at the drum 14, the logic of the electrical control may then cause the drum to be lifted up to allow this tread to pass by on conveyor 11 without contacting the pins 16. Also if, immediately ahead of this booking apparatus, a tread quality assurance monitor is used, treads not meeting specifications may also be excluded from the booking process by lifting drum 14. The pins 16 may also be retracted into the drum as a means of rejecting a tread.

Although one specific embodiment of the invention has been shown and described, it will be apparent to those skilled in the art that various other changes and modifications may be made without departing from this invention in its broader aspects. For example, the initial turning over of a tread, which in the preferred tread booking apparatus occurs at drum 14, may be performed at a station remote from this apparatus, and the tread then brought to the rollers 17 by means of a suitable conveyor. Alternatively, the tread may be extruded in an upside down condition from a tuber and then may be conveyed directly to the rollers 17. Accordingly, it is aimed in the appended claims to cover all such changes and modifications as fall within the true spirit and scope of this invention.

I claim:

1. A tread booking apparatus for sequentially receiving a plurality of tire treads at a common station therein and for transferring said treads selectively to a plurality of spaced receiving stations adjacent to said apparatus, comprising:
   conveyor means for sequentially delivering said treads to said common station; and
   aerial projection means sequentially engageable with said treads at said common station for transferring said treads through selected airborne trajectories to said receiving stations.

2. Apparatus as described in claim 1, wherein said conveyor means includes:
   a first conveyor for delivering treads sequentially to said tread booking apparatus;
   a second conveyor for receiving treads from said first conveyor and delivering said treads to said common station; and
   means intermediate said first and second conveyors for turning over said treads as they pass from said first conveyor to said second conveyor.

3. Apparatus as described in claim 2, wherein said aerial projection means transfers said treads through airborne trajectories in which said treads are turned over as they pass from said common station to said receiving stations.

4. Apparatus as described in claim 3, wherein said turn over means intermediate said first and second conveyors comprises a rotating tread engaging element.

5. Apparatus as described in claim 4, wherein said rotating tread engaging element comprises a drum having a plurality of tread penetrating pins disposed about the circumference of the drum.

6. Apparatus as described in claim 1, wherein said conveyor means is horizontally disposed and includes a plurality of longitudinally spaced, transverse rollers positioned at said common station, and wherein said aerial projection means includes a rotary assembly having a plurality of arms interleaved with said rollers, said arms being upwardly movable between said rollers to engage said treads at said common station and remove said treads from said conveyor means.

7. Apparatus as described in claim 6 and further including means for intermittently driving said rotary assembly through a 180° rotary cycle during which cycle a tread is engaged by said arms at said common station, said tread is lifted from said conveyor means and said tread is aerially projected through a predetermined trajectory to a predetermined receiving station.

8. Apparatus as described in claim 7 and further including means cooperative with said driving means for selectively varying the rotational speed of said rotary assembly to selectively vary the trajectories of the aerially projected treads.

9. Apparatus as described in claim 1 wherein said aerial projection means transfers each of said treads so engaged through a selected one of a plurality of airborne trajectories to a respective one of said receiving stations.

10. Apparatus as described in claim 9 wherein said trajectories each correspond to a different one of said receiving stations.

11. Apparatus as described in claim 1 and further including a tread truck comprising a plurality of vertically spaced leaves for receiving said aerially projected treads adjacent to said common station.

* * * * *